(12) United States Patent
Jamkhedkar et al.

(10) Patent No.: US 12,400,194 B2
(45) Date of Patent: Aug. 26, 2025

(54) UNIFIED TRANSACTION SERVICES FOR MULTI-TENANT ARCHITECTURES

(71) Applicant: PAYPAL, INC., San Jose, CA (US)

(72) Inventors: Prashant Jamkhedkar, Fremont, CA (US); Aravindan Ranganathan, San Jose, CA (US); Sandeep Kumar, Fremont, CA (US); Norihiro Aoki, Woodside, CA (US); Justin White, La Selva, CA (US); Jeffrey Meyer, Los Gatos, CA (US)

(73) Assignee: PAYPAL, INC., San Jose, CA (US)

( * ) Notice: Subject to any disclaimer, the term of this patent is extended or adjusted under 35 U.S.C. 154(b) by 852 days.

(21) Appl. No.: 17/462,750

(22) Filed: Aug. 31, 2021

(65) Prior Publication Data

US 2021/0398089 A1   Dec. 23, 2021

Related U.S. Application Data

(63) Continuation of application No. 16/213,811, filed on Dec. 7, 2018, now Pat. No. 11,113,675, which is a (Continued)

(51) Int. Cl.
  *G06Q 20/02*   (2012.01)
  *G06F 16/22*   (2019.01)
  (Continued)

(52) U.S. Cl.
  CPC ....... *G06Q 20/027* (2013.01); *G06F 16/2246* (2019.01); *G06F 16/2379* (2019.01); *G06Q 20/08* (2013.01)

(58) Field of Classification Search
  CPC .. G06Q 20/027; G06Q 20/08; G06F 16/2379; G06F 16/2246
  See application file for complete search history.

(56) References Cited

U.S. PATENT DOCUMENTS

| 7,657,639 B2 | 2/2010 | Hinton |
| 8,271,536 B2 | 9/2012 | Amradkar et al. |

(Continued)

FOREIGN PATENT DOCUMENTS

| CN | 105830388 | 8/2016 |
| CN | 105917309 | 8/2016 |

(Continued)

OTHER PUBLICATIONS

Extended European Search Report for European Application No. 19903189.9 mailed on Jan. 21, 2022, 10 pages.

(Continued)

*Primary Examiner* — Peter D Nolan
*Assistant Examiner* — Matthew Cobb
(74) *Attorney, Agent, or Firm* — HAYNES AND BOONE, LLP

(57) ABSTRACT

A method for using unified transaction services in a multi-tenant architecture system is discussed. The method includes receiving a request, at a first service provider, to provide a first transaction service for a user. The method includes accessing a first representation of the first service provider in a first hierarchical data structure, the first hierarchical data structure being managed by a second service provider, the second service provider managing user identity of the user. The method includes determining, based on the first representation, that transaction resources required for completion of the first transaction service are provided at the second service provider using a resource representation. The method also includes, responsive to determining that the transaction resources are accessible at the first service provider, accessing, at the first service provider, the transaction resources via the resource representation.

20 Claims, 7 Drawing Sheets

Related U.S. Application Data continuation-in-part of application No. 16/009,994, filed on Jun. 15, 2018, now Pat. No. 11,030,329.

(51) Int. Cl.
   *G06F 16/23* (2019.01)
   *G06Q 20/08* (2012.01)

(56) References Cited

U.S. PATENT DOCUMENTS

| | | | |
|---|---|---|---|
| 8,606,704 B2 * | 12/2013 | Roberts | G07F 17/0014 705/40 |
| 8,819,801 B2 | 8/2014 | Sangubhatla et al. | |
| 8,918,091 B1 | 12/2014 | Hoelzle et al. | |
| 8,918,641 B2 | 12/2014 | Smith et al. | |
| 9,058,481 B2 | 6/2015 | Prasad et al. | |
| 9,218,599 B1 | 12/2015 | Hilbring | |
| 9,710,664 B2 | 7/2017 | Sathyadevan et al. | |
| 9,781,122 B1 | 10/2017 | Wilson | |
| 9,992,186 B1 | 6/2018 | Drozd et al. | |
| 10,218,703 B2 | 2/2019 | Beiter | |
| 10,581,867 B2 * | 3/2020 | Srinivasan | H04L 63/104 |
| 10,853,763 B1 | 12/2020 | Armstrong et al. | |
| 10,931,656 B2 | 2/2021 | Carru et al. | |
| 11,734,658 B2 | 8/2023 | Jamkhedkar et al. | |
| 2002/0010591 A1 | 1/2002 | Pomerance | |
| 2002/0133412 A1 * | 9/2002 | Oliver | G06Q 30/02 705/26.8 |
| 2004/0117298 A1 | 6/2004 | Algiene et al. | |
| 2004/0128392 A1 | 7/2004 | Blakley et al. | |
| 2005/0261968 A1 | 11/2005 | Randall et al. | |
| 2006/0059565 A1 | 3/2006 | Green et al. | |
| 2007/0150480 A1 | 6/2007 | Hwang et al. | |
| 2007/0294405 A1 * | 12/2007 | Mohindra | H04L 67/51 709/226 |
| 2008/0154783 A1 | 6/2008 | Rule et al. | |
| 2008/0288400 A1 | 11/2008 | Panthaki et al. | |
| 2009/0125972 A1 | 5/2009 | Hinton et al. | |
| 2011/0276674 A1 | 11/2011 | Jensen-Horne et al. | |
| 2011/0276892 A1 | 11/2011 | Jensen-Horne et al. | |
| 2012/0072307 A1 | 3/2012 | Kassaei et al. | |
| 2012/0197963 A1 | 8/2012 | Bouw et al. | |
| 2012/0218917 A1 | 8/2012 | Komarevtsen | |
| 2012/0258777 A1 | 10/2012 | Huang | |
| 2013/0046600 A1 | 2/2013 | Coppinger | |
| 2013/0111558 A1 | 5/2013 | Sangubhatla et al. | |
| 2013/0132404 A1 * | 5/2013 | Liu | G06F 16/27 707/748 |
| 2013/0318241 A1 | 11/2013 | Acharya et al. | |
| 2014/0230076 A1 | 8/2014 | Micucci et al. | |
| 2015/0161620 A1 | 6/2015 | Christner | |
| 2015/0193775 A1 | 7/2015 | Douglas et al. | |
| 2015/0193858 A1 | 7/2015 | Reed et al. | |
| 2015/0348003 A1 | 12/2015 | Reader | |
| 2016/0087960 A1 | 3/2016 | Pleau et al. | |
| 2016/0092859 A1 | 3/2016 | Klingen | |
| 2016/0142409 A1 * | 5/2016 | Frei | G06F 21/33 713/176 |
| 2016/0203538 A1 | 7/2016 | Smits et al. | |
| 2016/0292694 A1 | 10/2016 | Goldschlag et al. | |
| 2016/0314460 A1 * | 10/2016 | Subramanian | G06Q 20/4014 |
| 2016/0335118 A1 | 11/2016 | Beiter et al. | |
| 2016/0337365 A1 * | 11/2016 | Beiter | H04L 63/101 |
| 2017/0012962 A1 | 1/2017 | Lissack et al. | |
| 2017/0048306 A1 | 2/2017 | Amador | |
| 2017/0318128 A1 | 11/2017 | Ananthanarayanan et al. | |
| 2017/0323117 A1 | 11/2017 | Pleau et al. | |
| 2018/0013763 A1 | 1/2018 | Wilson et al. | |
| 2018/0075231 A1 | 3/2018 | Subramanian et al. | |
| 2018/0081905 A1 | 3/2018 | Kamath et al. | |
| 2018/0309759 A1 | 10/2018 | Leibmann et al. | |
| 2019/0014120 A1 | 1/2019 | Drabant | |
| 2019/0026486 A1 * | 1/2019 | Pleau | H04L 63/104 |
| 2019/0097802 A1 | 3/2019 | Rowe et al. | |
| 2020/0007529 A1 | 1/2020 | Bahrenburg et al. | |
| 2020/0412538 A1 * | 12/2020 | Rosado | H04L 63/126 |
| 2021/0136083 A1 | 5/2021 | Gordon et al. | |
| 2021/0226788 A1 | 7/2021 | Bahrenburg et al. | |

FOREIGN PATENT DOCUMENTS

| | | |
|---|---|---|
| CN | 107852417 A | 3/2018 |
| CN | 108322472 A | 7/2018 |
| CN | 108337260 A | 7/2018 |
| EP | 3361700 B1 | 8/2021 |

OTHER PUBLICATIONS

Ashwini A., "What Are the Pros and Cons of Multi-tenancy in Rails Application?", Retrieved from the Internet: https://medium.com/swlh/what-are-the-pros-and-cons-of-multi-tenancy-in-rails-application-547d0f9c205f, Oct. 3, 2017, 9 pages.

Axero., "Single Tenant vs Multi Tenant Business Software", Communifire, Retrieved on Apr. 30, 2018, Retrieved from the Internet URL: https://axerosolutions.com/blog/single-tenant-vs-multi-tenant-business-software, 9 pages.

Crown N., "An Introduction to SCIM: System for Cross-Domain System for Cross-Domain Identity Management", RSAConference, Europe, 2012, Retrieved on Apr. 24, 2018, Retrieved from the Internet URL: https://docs.huihoo.com/rsaconference/europe-2012/How-SCIM-Simplifies-Migration-to-Cloud-Services.pdf, 24 pages.

Ed K.L., et al., "System for Cross-Domain Identity Management: Definitions, Overview, Concepts and Requirements" Retrieved on Apr. 24, 2019, Retrieved from the Internet URL: https://www.rfc-editor.org/rfc/pdfrfc/rfc7642.txt.pdf, 19 pages.

European Application No. 19819808.7, Extended European Search Report mailed on Jun. 8, 2021, 7 pages.

International Appl. No. PCT/US2019/037242, International Preliminary Report on Patentability mailed on Dec. 24, 2020, 12 pages.

International Appl. No. PCT/US2019/037242, International Search Report and Written Opinion mailed on Oct. 4, 2019, 12 pages.

International Appl. No. PCT/US2019/064325, International Search Report and Written Opinion mailed Mar. 24, 2020, 16 pages.

International Application No. PCT/US2019/064325, International Preliminary Report on Patentability mailed on Jun. 17, 2021, 6 pages.

International Application No. PCT/US2019/068993, International Preliminary Report on Patentability mailed on Jul. 8, 2021, 8 pages.

International Application No. PCT/US2019/068999, International Preliminary Report on Patentability mailed on Jul. 8, 2021, 7 pages.

International Application No. PCT/US2019/068999, International Search Report and Written Opinion mailed on Mar. 31, 2020, 8 pages.

International Search Report and Written Opinion for International Application No. PCT/US2019/68993 mailed on Mar. 31, 2020, 14 pages.

International Search Report and Written Opinion for International Application No. PCT/US2019/68999 mailed on Mar. 31, 2020, 14 pages.

Jones M., et al., "JSON Web Token (JWT)," Internet Engineering Task Force (IETF), May 2015, 30 pages.

Kabbedijk J., et al., "Multi-Tenant Architecture Comparison", Retrieved on Apr. 30, 2018, Retrieved from the Internet URL: https://pdfs.semanticscholar.org/17fb/e778244aa190da9d56c5fb8c2e64c63cd621.pdf, 8 pages.

Microsoft., "Chapter 2: Key Principles of Software Architecture," Retrieved on Apr. 30, 2018, 6 pages.

Mundra M., "Multi-Tenant Vs. Single-Tenant Architecture (SaaS)," Retrieved from the Internet URL: https://blogs.sap.com/2015/07/12/multi-tenant-vs-single-tenant-architecture-saas/, Jul. 12, 2015, 5 pages.

Nidhiben S., et al., "Multi-Tenant Access and Information Flow Control for SaaS", IEEE International Conference on Web Services, Jun. 27, 2016, Retrieved from the Internet URL: https://ieeexplore.ieee.org/document/7557990, Retrieved on Mar. 3, 2021, 8 pages.

Sageintacct., "Multi-Tenancy is Fundamental to SaaS Applications— and It's Better for You, Too" Retrieved on Dec. 7, 2018, Retrieved

(56) References Cited

OTHER PUBLICATIONS from the Internet URL: https://www.sageintacct.com/cloud-erp/multi-tenant-cloud-architecture, 4 pages.

Multitenancy—Wikipedia; Oct. 18, 2019; https://en.wikipedia.org/w/index.php?title=Multitenancy&oldid= 598245774; pp. 1-5.

First Office Action for Chinese Application No. 201980052687.4, mailed on Jan. 30, 2024, 13 pages.

First Office Action for Chinese Application No. 201980087063.6, mailed on Dec. 28, 2023, 5 pages.

Mohamed F., et al., "An Integrated Platform for Dynamic Adaptation of Multi-Tenant Single Instance SaaS Applications," 2017 IEEE 5th International Conference on Future Internet of Things and Cloud, 2017, pp. 257-264.

Zheng J., "A Framework for Migration of Conventional Client-Server Software Systems to Cloud," May 2014, The University of New Brunswick, 114 pages.

European Patent Application No. 19819808.7, European Patent Office, Examination search report dated Dec. 23, 2024, 8 pages.

* cited by examiner

UNIFIED TRANSACTION SERVICES FOR MULTI-TENANT ARCHITECTURES

CROSS-REFERENCE TO RELATED APPLICATIONS

This application claims the benefit of and is a continuation of U.S. application Ser. No. 16/213,811, filed Dec. 7, 2018, which is a continuation-in-part of U.S. application Ser. No. 16/009,994, titled "Unified Identity Services for Multi-Tenant Architectures," filed on Jun. 15, 2018 and issued as U.S. Pat. No. 11,030,329 on Jun. 8, 2021, the disclosure of which is incorporated herein by reference in its entirety.

BACKGROUND

Embodiments of the present disclosure generally relate to the field of software architecture and, more particularly, to managing how various entities are on-boarded, managed, and/or accessed in a multi-tenant system architecture.

Complex software systems can have various architectures, including a single-tenant software architecture and a multi-tenant software architecture, among others. In a single-tenant software architecture, each entity (such as a company or a portion of that company) can have their own instances of each software application, data, and any supporting infrastructure. In a single-tenant architecture, the software for each tenant entity can be customized as desired. However, drawbacks of using the single tenant architecture include expense in resources, as well as requirements to host, customize, and maintain separate software applications for each tenant.

In contrast, in a multi-tenant software architecture, each entity can share the same instances of applications, data, and/or infrastructure. A multi-tenant software provider can provision their applications and/or resources to multiple entities from a single software architecture. In multi-tenant software architecture, access to data can be shared among the various entities. By sharing much of the applications, data, and software, various resources such as installation, configuration, number of physical servers, maintenance, and even power can be optimized. However, drawbacks of using multi-tenant architecture include complexity of managing how multiple software applications are configured and shared among multiple clients. Also, design of multi-tenant architecture-based software systems that provides secure and reliable access to the data, resources, and/or transaction services that operate using the data and/or resources can be problematic. Furthermore, interoperability difficulties may arise when using software applications, in a multi-tenant architecture system, that were initially managed and/or hosted by different businesses.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
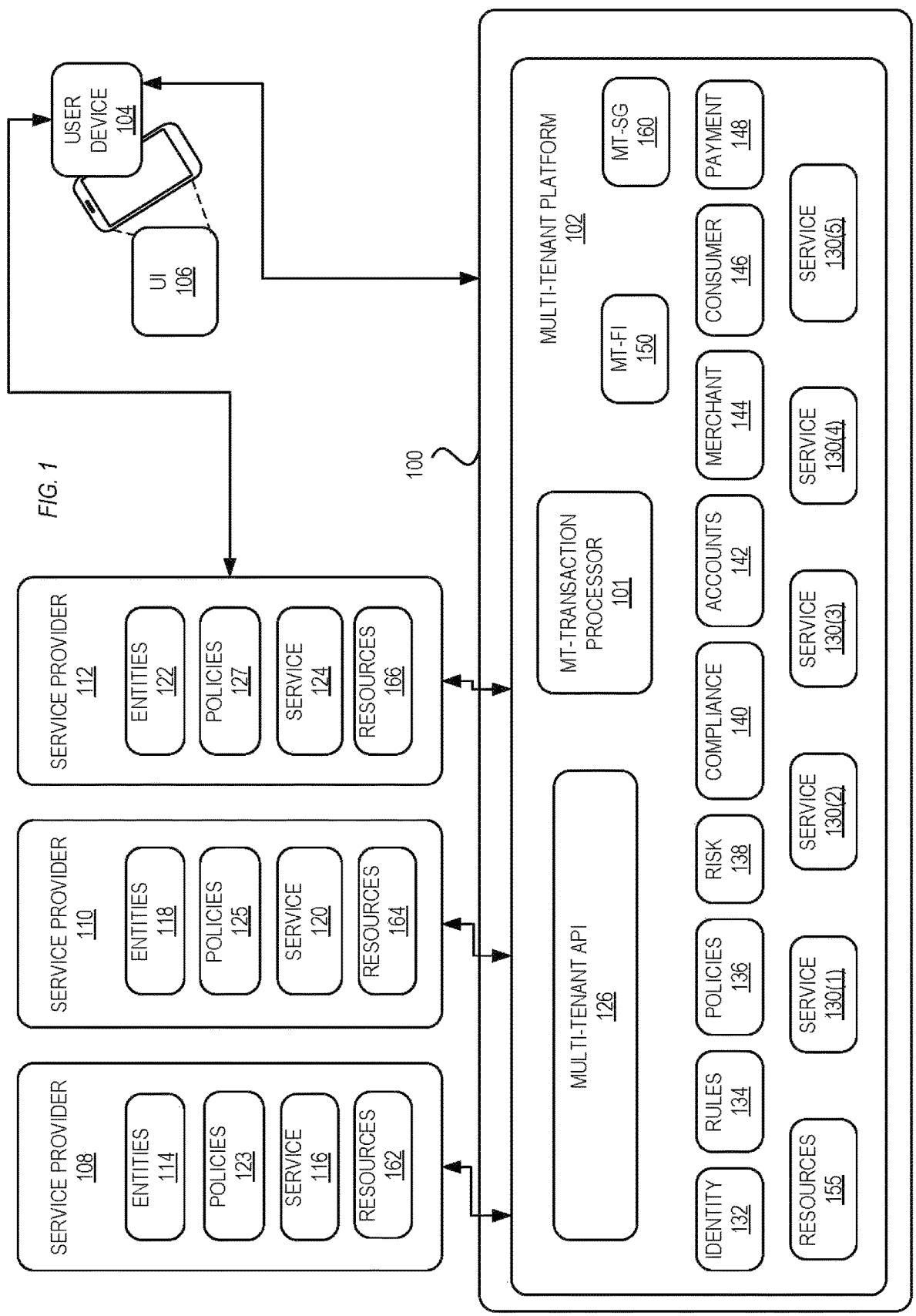
FIG. 1 is a system diagram illustrating embodiments of a multi-tenant software architecture system that can be accessed by communicating with a user device.

The description that follows includes exemplary systems, methods, techniques, instruction sequences, and/or computer program products that embody techniques of the present disclosure. However, it is understood that the described embodiments may be practiced without these specific details. For instance, although some examples refer to accessing tenant services, other types of service providers are contemplated, such as of Software-as-a-Service (SaaS), among others.

In a multi-tenant software architecture described herein, each tenant can share the applications, data, and/or infrastructure. A multi-tenant software provider can use a multi-tenant software platform to provision applications and/or resources to multiple entities. The multi-tenant software platform can facilitate addition of new tenants and onboard data and/or services provided by these new tenants. The multi-tenant software platform can implement rules and policies for data access by various entities across the tenants. The multi-tenant software platform can use identity services to provide access to these services, such as from an entity associated one tenant to a service provided by another tenant. The multi-tenant software platform can facilitate transaction services between tenants, such as a transaction service originating at one tenant that accesses resources at another tenant.

The multi-tenant software platform (also referred to as a multi-tenant platform) can include multiple tenants that have been previously on-boarded. The multi-tenant platform can facilitate access, using a unified identity associated with a user, to the entities, policies, and services of these tenants. The tenants can be hosted and managed by service providers. Access to the services can be determined based on privileges of the unified identity, as well as on policies of each of the tenants. The services can include various merchant services, such as in-store check-out (at a certain tenant) via a user device (associated with the unified identity), access to an online store of the tenant, order-ahead at a certain store of the tenant, a cash-in process (e.g., at an Automated Teller Machine (ATM)) at a certain tenant, a cash-out process (e.g., at an ATM), self-checkout for fuel at pay-at-the-pump stations of the tenant, among others.

The services can include SaaS and Platform as a Service (PaaS) services and/or other cloud services that are accessible by the user device. For example, the solution provider can provide access, to the user device, to various software applications, or deliver such software to the user device. The services can also include inter-tenant transaction services, where a transaction service that is originated at a first tenant needs to access transaction resources at a second tenant. The multi-tenant platform can access other services, such as multi-tenant identity services, multi-tenant social graph service, and/or multi-tenant transaction resource service to determine how to process a certain inter-tenant transaction service.

The multi-tenant platform can thus utilize unified identity services to provide access to selected services and/or data of the tenants based on policies associated with each of the tenants. The multi-tenant platform can use separate databases to store data to achieve isolation, such as when new tenants are on-boarded onto the existing platform, and to provide logical and/or physical data isolation. Shared data access can be made possible by on-boarding the tenants and selectively cross-exposing services. For example, for a multi-tenant platform managed by PAYPAL, certain capabilities of the multi-tenant platform such as Risk-as-a-Service (RaaS) and/or TRaaS (Transaction Resource as a Service) can be provided to certain users of on-boarded tenants such as XOOM. Similarly, certain capabilities of XOOM such as Fund Sending can be provided to certain users of PAYPAL. Thus, in some embodiments, the multi-tenant platform can include a core tenant (such as PAYPAL) that offers core services and infrastructure (including Identity-as-a-Service (IaaS) functionality and TRaaS) and any additional data access to selected tenants and/or users accessing the multi-tenant platform from that tenant. The level of access to the core services and/or infrastructure can be determined by rules and/or policies of each tenant and/or of the multi-tenant platform.

The multi-tenant platform can onboard new tenants by using a one or more hierarchical data structures. In some embodiments, the multi-tenant platform can expose appropriate user experiences for a user application based on the user request. The multi-tenant platform can implement methods for providing IaaS services to various entities and/or tenants. The multi-tenant platform can provide the IaaS and other services based on the hierarchical data structures. As discussed below, the multi-tenant platform can process user requests (e.g., from users of the core tenant or from users of an on-boarded tenant) and determine how to access and process services, including inter-tenant services.

In some embodiments, the multi-tenant platform can receive a request, at a first service provider, to provide a first transaction service for a user. The multi-tenant platform can access a first representation of the first service provider in a first hierarchical data structure that is managed by a second service provider, where the second service provider manages user identity of the user. The multi-tenant platform can determine, based on the first representation, that transaction resources required for completion of the first transaction service are provided at the second service provider using a resource representation. The multi-tenant platform can, responsive to determining that the transaction resources are accessible at the first service provider, access, at the first service provider, the transaction resources via the resource representation. The following description and associated Figures illustrate various embodiments directed to the ideas listed above.

FIG. 1 is a system diagram illustrating embodiments of a multi-tenant software architecture system that can be accessed by communicating with a user device. In an overview of the system diagram, a user device 104 can communicate with a processing system 100 that includes a multi-tenant platform 102. The processing system 100 can process requests using a multi-tenant transaction processor (mt-transaction processor) 101. The multi-tenant platform 102 can provide access to multiple service providers 108, 110, and 112. In some embodiments, the multi-tenant platform 102 can model each of the service providers 108-112 such that the mt-transaction processor 101 can access services 116-124, policies 123-127, and/or resources 162-166 of the service providers.

The multi-tenant platform 102 includes core services at elements 132-148, as well as additional services 130(1)-130(5). The multi-tenant platform 102 can provide services to the service providers 108-112, such as IaaS services that may be required for accessing other services. Thus, the multi-tenant platform 102 can manage a plurality of tenants, each one of which can be associated with one or more services, which are then exposed for access. In some embodiments, each of the service providers 108-112 can be the actual providers that are then represented (e.g., by modeling) in the multi-tenant software architecture (i.e., in the multi-tenant platform 102). Although not shown in FIG. 1, each of the service providers 108-112 can include a respective transaction processor for processing own requests. The mt-transaction processor 101 can be a transaction processor that was fully integrated onto the multi-tenant platform 102. The mt-transaction processor 101 can be a default transaction processor for processing transactions.

The multi-tenant platform 102 can store user information for users at the accounts 142. In some embodiments, the accounts 142 includes information for users (also referred to as "core users") of a core tenant. The core tenant can be one of the service providers 108-112, or a service provider that is fully integrated into the multi-tenant platform 102. The multi-tenant platform 102 can facilitate provision of various core services to the core users. The core services can include identity services 132, risk services 138, compliance services 140, and payment services 148. In one embodiment, the multi-tenant platform 102 provides IaaS services at the identity services 132 element. The identity services 132 can generate and maintain a core hierarchical data structure for managing its core entities. The core services can also include access to policy configuration 136, as well as access to accounts 142, merchants 144, and consumers 146. The accounts 142 are associated with the identity services 132. The multi-tenant platform 102 can also provide inter-tenant transaction services, such as between tenants 108 and 110, where the tenants 108 and 110 need not be fully integrated.

The processing of a certain transaction can be initiated by the mt-transaction processor 101 by using a single instance of an MT-IDP (such as the MT-IDP 246 discussed below) to access resources (as required by the transaction) at a certain service provider. In one example, the processing system 100 can process a transaction service that is requested at the service provider 108. For example, the mt-transaction processor 101 can use the multi-tenant platform 102 to process a request that is received from the service provider 108 for use of certain transaction resources, which can be provided by the multi-tenant platform 102 and/or by other service providers 110-112. These transaction resources can be accessed, at the multi-tenant platform 102, via a resource representation. The multi-tenant platform 102 can access the identity 132 services, transaction resource service 150 (referred to also as MT-FI 150), and/or the social graph service 160 (referred to also as MT-SG 160) to determine the resource representation.

The service provider 108 can include entities 114, policies 123, services 116, and transaction resources 162. Similarly, the service providers 110 and 112 include entities 118 and 122, policies 125 and 127, services 120 and 124, and/or transaction resources 164 and 166, respectively. The elements 114, 123, 116, and 162 of the service provider 108, and similar elements of the service providers 110 and 112 can be modeled by the multi-tenant platform 102, as discussed below. The multi-tenant platform 102 can determine how transaction resources (for a certain transaction) are being provided, such as by redirecting the request to use actual transaction resources that are hosted by one of the other service providers 110 or 112. For example, the actual transaction resources at the service provider 112 can be accessed by the mt-transaction processor 101 through the multi-tenant platform 102 via the resource representation. The multi-tenant platform 102 can thus facilitate processing of transactions using a unified multi-tenant architecture for transactions (i.e., service transactions) that originate at one tenant and use resources at another tenant. As discussed below, the multi-tenant platform 102 can determine to use another transaction processor (e.g., an actual transaction processor of the service provider 110) for processing of the transaction.

FIG. 1 is a system diagram illustrating embodiments of a multi-tenant software architecture system that can be accessed by communicating with a user device. In an overview of the system diagram, a user device 104 can communicate with a processing system 100 that includes a multi-tenant platform 102. The processing system 100 can process requests using a multi-tenant transaction processor (mt-transaction processor) 101. The multi-tenant platform 102 can provide access to multiple service providers (also referred to as tenants) 108, 110, and 112. In some embodiments, the multi-tenant platform 102 can model each of the service providers (i.e., tenants) 108-112 such that the mt-transaction processor 101 can access services 116-124, policies 123-127, and/or resources 162-166 of the service providers.

In some embodiments, the mt-transaction processor 101 can access, via the resource representation, a modeled resource as modeled by the multi-tenant platform 102. The multi-tenant platform 102 then can facilitate access to the actual transaction resource that is associated with the modeled resource. Thus, the actual transaction resources 166 at the service provider 112 can be accessed by the mt-transaction processor 101 through the multi-tenant platform 102 via the resource representation. The actual transaction resource at the service provider 112 can be consumed. For example, the actual transaction resources 166 can correspond to a certain a financial instrument that is on-boarded by the service provider 112. The actual transaction resources 166 can correspond to incentives that are associated with the user's account. In another example, the actual transaction resource 166 can correspond to certain memory and/or computing resources (e.g., for a certain requested SaaS transaction). Upon processing, a value of that transaction resource at one tenant can be changed, such as decremented from one value to another value (and potentially incremented at another value of another transaction resource at another tenant).

The multi-tenant platform 102 can onboard the service providers 108-112, such as to generate models of the respective service provider(s). As discussed below, the onboarding process can include accessing identity services to determine at least a portion of the entities that are being managed by the respective identity service. If the entities are not being migrated (e.g., by being fully integrated) to the identity services 132, then the identity services can generate representations of the entities being on-boarded in the core hierarchical data structure. These representations are then being used by the IaaS service to determine and use the unified identity (for a certain user) across the multi-tenant platform 102. The representations can include lightweight elements and/or linked elements. The identity services 132 can manage and access the policy configuration 136, such as to enforce access to certain customer and/or merchant domains. The policy configuration 136 can be accessed via the hierarchical data structures (discussed below) for each entity. The process of generating and using user representations is explained in more detail below.

The multi-tenant platform 102 can communicate, via the multi-tenant API 126, with the service providers 108-112 and/or the user device 104. The multi-tenant platform 102 can provide, based on a certain unified identity, information related to a tenant, associated services, and/or associated user experiences, to a requesting entity via the multi-tenant tenant API 126. Furthermore, the multi-tenant platform 102 can facilitate communication between various tenants 108-112, such as by providing IaaS services and use of unified identity.

For example, a new tenant, such as the service provider 112, can be on-boarded by the multi-tenant platform 102. Information on the new tenant can be stored by one or more of the core services 132-148. In some implementations, upon onboarding, a namespace (e.g., its entities such as merchants and/or customers) that is associated of each tenant can be onboarded onto the identity services 132. In some embodiments, one or more of services of the new tenant, such as the service 124, can be exposed for access to other users of the multi-tenant platform 102. In one embodiment, the multi-tenant platform 102 can also generate a representation 130(5) of the service 124 at the multi-tenant platform 102. Thus, any access from other tenants, such as from the user device 104 or from the service provider 110), to the service 124 is performed via a unified identity (e.g., by using IaaS) at the service representation 130(5). In some embodiments, for onboarded tenants that are fully integrated, access to services of that tenant can be performed by the mt-transaction processor 101 directly, without using representations of the fully integrated service. In some embodiments, for onboarded tenants that are not fully integrated, access to services of that tenant can be performed by the mt-transaction processor 101 by calling the representation 130(5) of the onboarded (but not fully integrated) service. The representation 130(5) can then access the actual service 124.

The user device 104 can be any type of a computing device that can communicate user requests to the multi-tenant platform 102. The user device 104 can be implemented as a kiosk, a point-of-sale (PoS) terminal, a mobile device, among others. The user device 104 includes a user interface (UI) 106 through which the user can interact with displayed user experiences, such as to access certain services provided via the multi-tenant platform 102. The user device 104 can generate and communicate a user request for a certain service at the multi-tenant platform 102. The user device 104 can interface with the service provider 108-112 and/or with the processing system 100. The transaction processor then can communicate with various components of the multi-tenant platform 102, such as via the multi-tenant API 126.

In some embodiments, one of the tenants 108-112 can implement one or more payment system functions. In one embodiment, the core service provider (that is integrated into the multi-tenant platform 102) can process a payment and order fulfilment for services provided via user experiences accessed at the UI 106. The core service provider can perform risk analysis (e.g., via the Risk core service 138) to determine whether to perform a certain service and/or process a payment for that service. In some embodiments, the core service provider can perform risk and/or verification services for the new tenant 112 being on-boarded by the multi-tenant platform 102. The core service provider can process payments from the user account that is associated with the user device 104. The core service provider can provide financial services, such as a fund transfer (e.g., a transfer of a certain monetary amount), to the user. The core service provider can include payment accounts, each of which can be associated with a buyer or a seller.

Once on-boarded as a core tenant, the accounts of the core service provider can be stored and accessed directly at the multi-tenant platform at the accounts 142 element. For example, a buyer (e.g., a user of the user device 104) can be associated with one payment account, and the seller (e.g., one of the tenants) can be associated with another payment account at the payment system (which can be implemented using the processing system 100). Upon successfully performing the risk analysis on the requested service (e.g., a requested transaction at the tenant), the core service provider can then perform (e.g., via the payment core service 148) a fund transfer from the buyer's payment account to the seller's payment account.

The payment system can be implemented by PAYPAL or another online payment system that allows users to send, accept, and request fund transfers. In some embodiments, the user experience can also provide access to certain services. Thus, in addition, or instead of, a payment service, the user experience can include other functionality that is unique for the certain tenant, such as selection of items for order, access to certain SaaS functionality, among others. Thus, the solution provider can provide funds in/funds out services, as determined based on the location data, from the payment system to the users of the user devices.

For simplicity, FIG. 1 only shows a single user device 104. However, as discussed herein, the multi-tenant platform 102 interfaces with multiple user devices, and thus provides access to services to many different users. Similarly, the multi-tenant platform 102 can onboard multiple tenants in addition to the ones shown. The multi-tenant platform 102 can also have multiple core tenants that are incorporated as part of the core services 132-148.

Figure 2:
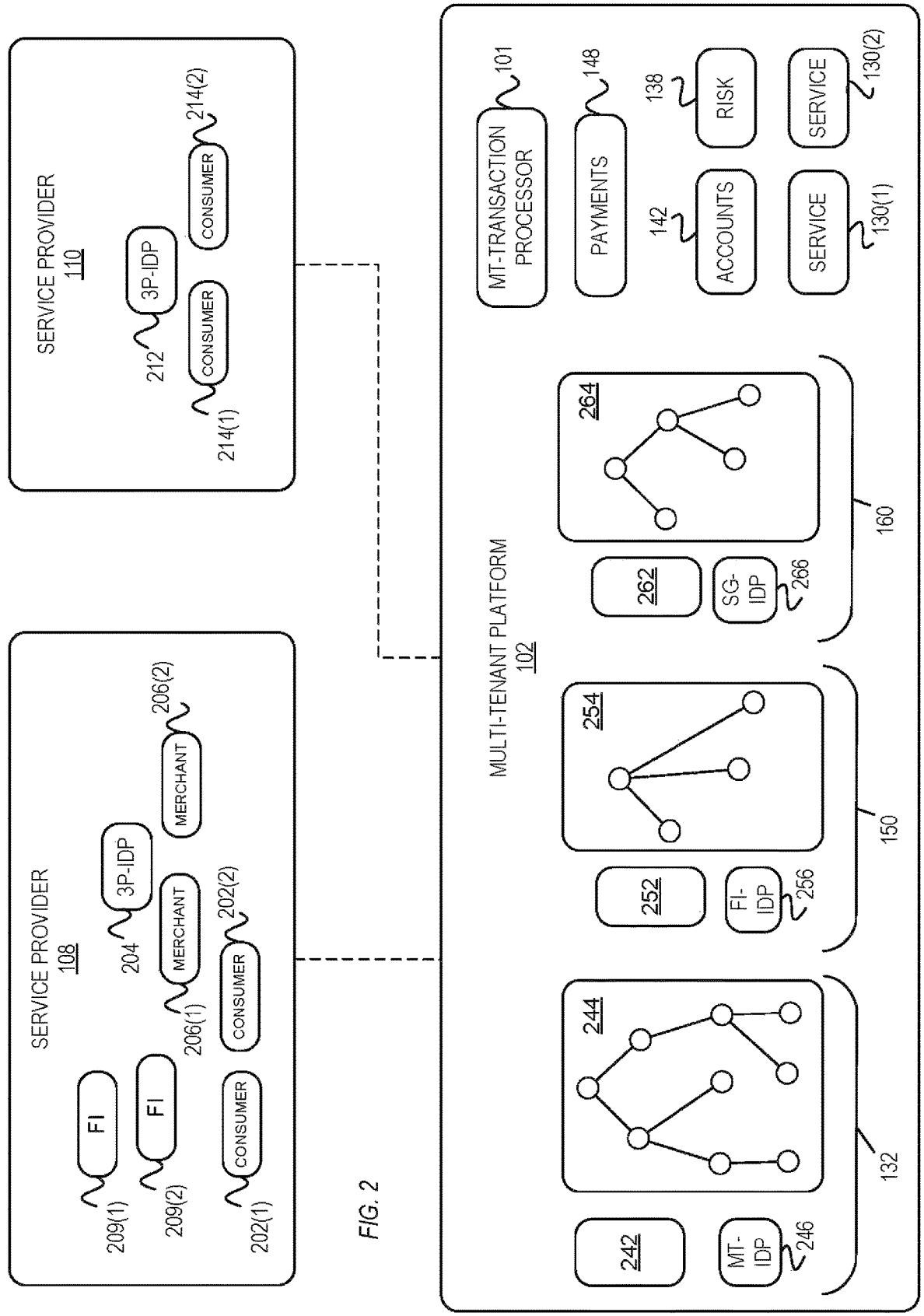
FIG. 2 is a system diagram illustrating embodiments of the multi-tenant software architecture of FIG. 1 including unified transaction services.

FIG. 2 is a system diagram illustrating embodiments of the multi-tenant software architecture of FIG. 1 including unified transaction services. FIG. 2 shows embodiments of how the identity services of the service providers 108 and 110 are modeled by the multi-tenant platform 102. As shown, the (actual) service provider 108 can include a third-party identity provider (3P-IDP) 204 that manages entities of merchant 206(1) and 206(2), and entities of consumer 202(1) and 202(2). Similarly, the (actual) service provider 110 can include a 3P-IDP 204 that manages entities of consumer 214(1) and 214(2). In some examples, prior to being on-boarded, the service provider 108 is operable to perform services 116 (optionally based on the policies 123) for the entities 114 using the resources 162, without using the multi-tenant platform 102.

The multi-tenant platform 102 includes the identity service 132, the accounts 142 element, the risk 138 element, as well as services 130(1) and 130(2). The multi-tenant platform 102 also includes the identity service 132, the accounts 142 element, the risk 138 element, as well as services 130(1) and 130(2). The service provider 108 can be modeled by the multi-tenant platform 102 by the identity service 132, e.g., as part of the hierarchical data structure 244. As discussed below with reference to FIGS. 3-5, the identity service 132 can model some parts of the service provider 108, including the 3P-IDP 204, the merchants 206(1) and 206(2), the consumers 202(1) and 202(2), and/or the FIs 209(1) and 209(2). The identity service 132 can similarly model some parts of the service provider 110 and/or other service providers. The identity service 132 can model each of the service providers 108 and/or 110 as service provider representations that can be generated during onboarding of the respective service providers 108 and/or 110. The 3P-IDPs 204 and 212 can be represented, in the hierarchical data structure 244, of the actual IDPs provided by the service providers 108 and 110, respectively.

The identity service 132 includes an access tier 242 and the hierarchical data structure 244 that is managed by an MT-IDP 246. The multi-tenant platform 102 also includes services 138, 142, and 130(1)-130(2). The access tier 242 is a part of the identity service 132 that customizes data associated with the service provider when being on-boarded with the multi-tenant platform 102. For example, the access tier 242 includes information about the products and/or services being offered by the service provider 108, as well as service endpoints for accessing services (e.g., the service 116) offered by the service provider 108. The service endpoints can be referenced by a corresponding node in the hierarchical data structure 244 that represents the service provider 108.

Various embodiments of how the hierarchical data structure 244 is generated and accessed are discussed below with reference to FIGS. 3 and 4. The MT-IDP 246 can generate and manage representations of the entities of the onboarded tenants, i.e., entities 206(1), 206(2), 202(1), and 202(2), as well as the 3P-IDP 204 of the service provider 108. Similarly, the MT-IDP 246 can generate and manage representations of entities 214(1), 214(2), 212 of the service provider 110.

Since each of the service providers 108 and 110 includes own 3P-IDP 204 and 212 respectively, each of these tenants can continue to manage the identities of their own respective entities. For example, the service provider 110 can continue to manage the entities 214(1)-214(2), including managing identity information, contact data, and any characteristics of the consumers 214(1) and 214(2). The service provider 110 can update any changes to the entities 214(1) and 214(2) to the multi-tenant platform 102, such as via a representation of the 3P-IDP 204 in the hierarchical data structure 244. These 3P-IDP 212 originated updates are used to keep the data of their respective representations up-to-date. Similarly, any services (such as core services) performed via the representations of the hierarchical data structure 244 can be propagated back to the 3P-IDP 212.

The transaction resource service 150 (referred to also as MT-FI 150) can include a resource access tier 252 and a hierarchical data structure 254 that is managed by an FI-IDP 256. The resource access tier 252 can customize resource data associated with entities of the service provider when being on-boarded with the multi-tenant platform 102. The resource access tier 252 includes information about the resources 162 that is associated with each one of the entities of the respective service provider, such as resources associated with the consumer 202(1) and/or resources associated with the consumer 214(1). The resource access tier can also include information about transaction services being offered by the service provider 108, as well as service endpoints for accessing the transaction services that use the resources 162. The service endpoints can be referenced by a corresponding node in the hierarchical data structure 254. In some embodiments, the resources can be implemented as funding instruments, e.g., for the consumers 202(1) and 202(2).

Similarly, the social graph service 160 (referred to also as MT-SG 160) can include a social access tier 262 and a hierarchical data structure 264 that is managed by an SG-IDP 266. The social access tier 262 can customize social data associated with the entities of the service provider when being on-boarded with the multi-tenant platform 102. The social access tier 262 includes information about links between each of the consumers, such as consumers 202(1), 202(2), 214(1), and/or 214(2). The social access tier 262 can also include service endpoints for accessing various social media applications based on which the hierarchical data structure 264 is generated.

In some implementations, the multi-tenant platform 102 can enable co-ordination of multiple identity namespaces (e.g., separate namespaces associated with the service provider 108, the service provider 110, as well another namespace associated with the fully integrated service provider of the multi-tenant platform 102) to efficiently and securely transfer transaction resources between identities corresponding to entities of these namespaces. For example, a user in one domain (e.g., a namespace associated with the service provider 108) can, via the multi-tenant platform 102, lookup users in other namespaces (e.g., a user in a namespace associated with the service provider 110, or a merchant associated with the service provider 112) and establish a relationship including transaction resource transfers.

In some embodiments, a user (e.g., a customer) can onboard as an entity to any of the service providers 108-112. In one example, the user can onboard onto the service provider 108. As the service provider itself is a tenant in the multi-tenant architecture 102, a representation of the user would be created by the identity services 132 (such as under a 3P-IDP representation for that tenant representation in the hierarchical data structure 244). That 3P-IDP can be indicated as a system-of-record (SOR) for that onboarded user. Once the user has onboarded, the transaction resources (e.g., funding instruments) for the user would be managed by the MT-FI 150. The user can add/remove transaction resources 162 by accessing the service provider 108, which would be reflected by the MT-FI 150. The multi-tenant platform 102 can identify the user in the namespace for the service provider 108, and can also associate (via the identity services 132) that user with the same user in another namespace (e.g., in the namespace for the service provider 110). The multi-tenant platform 102 can use the identity services 132 to identify the same user and his/her transaction resources across various namespace, thus enabling the same user to have multiple accounts in different namespaces and potentially linking or federating these accounts.

In some embodiments, during the onboarding process for a new tenant, there is a phase of tenant Setup where entities (e.g., consumer representations of the actual consumer, linked consumer for VENMO (e.g., the service provider 108) consumer under VENMO tenancy are modeled with specific policies set for the tenant. When the tenant (e.g., VENMO) gets its credentials (client identifier and secret) from the multi-tenant platform 102, the credentials can include appropriate Access Token and/or Refresh Tokens. These tokens can indicate embedded tenant information. When the tenant calls into the multi-tenant API 126, the multi-tenant platform 102 can authorize the request and convert the Access Token into a Security token.

When transaction resources are on-boarded onto the MT-FI 150, the tenant identifier can be used by the MT-FI 150 and the associated details can be retrieved from the security context (of the security token). In some embodiments, some details around the tenant and the associated accounts can be inferred from the Access Token and the translated security context after validation/verifications from the identity services 132. Thus, when a new Venmo user account is generated, the identity services 132 can create a representation of that account in the hierarchical data structure 244, and associated funding instruments for that user can be added to the MT-FI 150.

Figure 3:
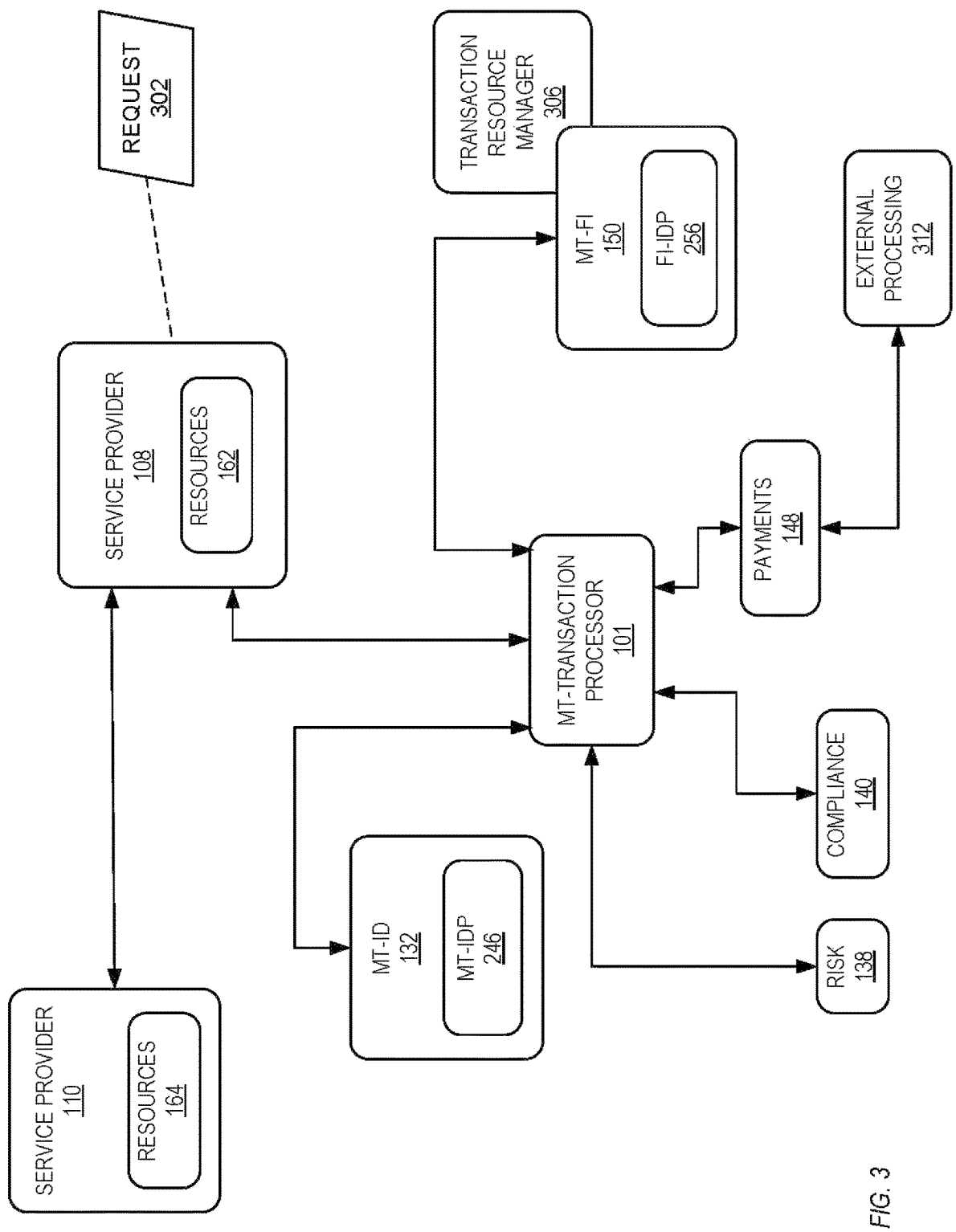
FIG. 3 is a diagram illustrating embodiments of flow of operations of using the multi-tenant software architecture for unified transaction services.

FIG. 3 is a diagram illustrating embodiments of flow of operations of using the multi-tenant software architecture for unified transaction services. FIG. 3 illustrates a logical view of how transactions are processed between service providers 108 and 110 using the mt-transaction processor 101. In some embodiments, any one of the service providers 108 or 110 can receive a request 302 to provide a transaction service to a user. The service provider 108 includes resources 162. In some embodiments, at least a portion of the resources 162 (e.g., for certain users of the service provider 108) can be associated with certain elements of the resources 164 at the service provider 110. Thus, a transaction for a certain user that accesses the user's resources at the resources 162, would instead use the associated element of the resources 164 at the service provider 164.

The resources 162 can be modeled by the MT-FI 150, such as by using resource representations using the hierarchical data structure 254 that is managed by the FI-IDP 256. In some embodiments, a transaction resource manager 306 can be used to manage resource representations that are mapped to each tenant represented by the MT-ID 132. For example, the transaction resource manager 306 can be implemented as a separate wallet for the tenant/service provider 108. The transaction resource manager 306 can manage separate MT-FIs for each customer of the tenant 108.

The mt-transaction processor 101 can process transactions, such as ones indicated by the request 302. Transactions can be processed using the risk 138 and/or compliance services 140 based on identity data of the MT-ID 132 and resource data of the MT-FI 150. Once the mt-transaction processor 101 determines the appropriate identity and resources for the transaction, they can be passed to the payment core service 148. The payment core service 148 can process the transaction and use the external processing 312, such as external processors, networks (e.g., credit card networks), and/or issuers.

Figure 4:
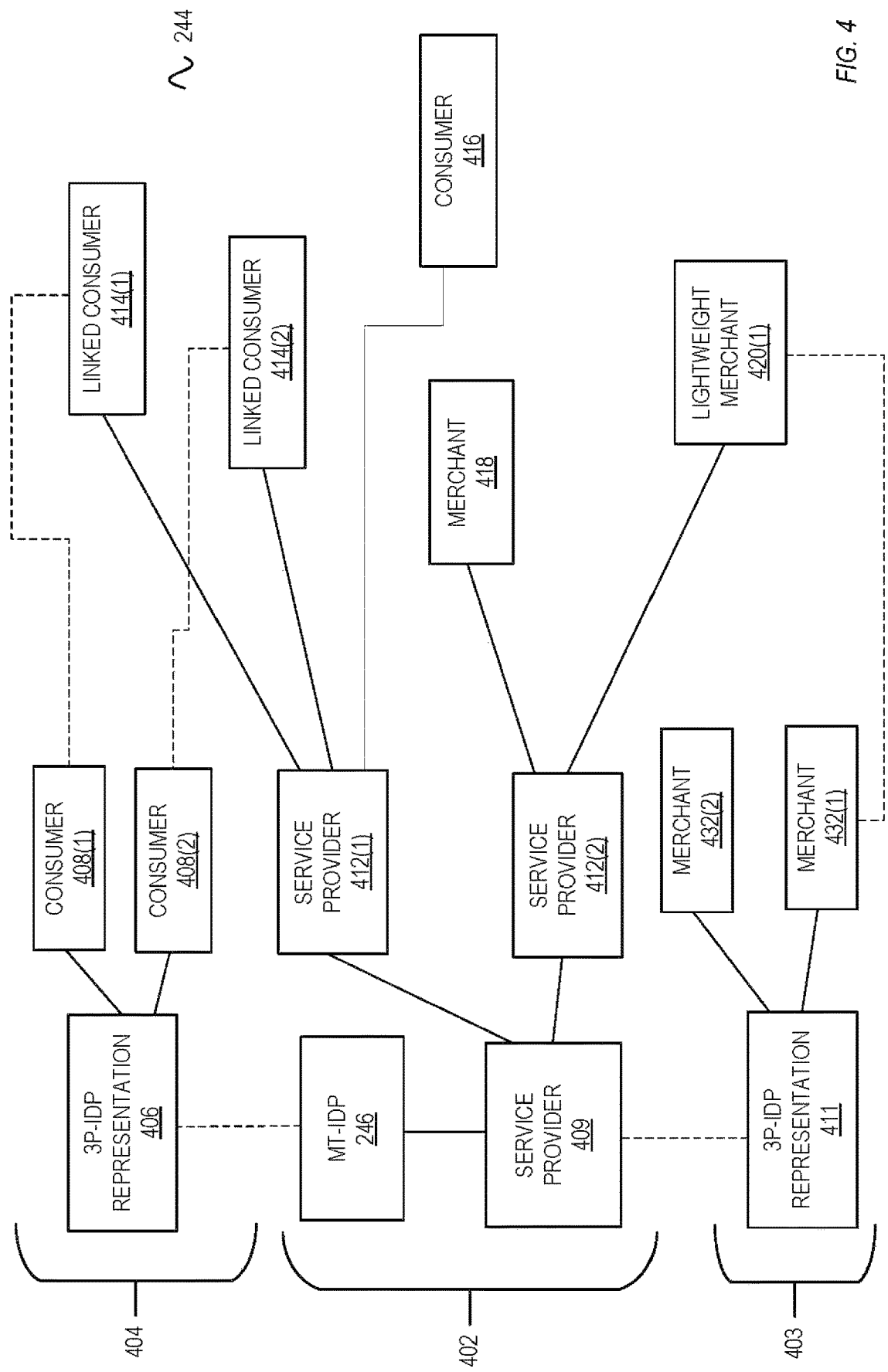
FIG. 4 is a diagram illustrating hierarchical data structures used by the multi-tenant software architecture systems that provide unified transaction services.

FIG. 4 is a diagram illustrating hierarchical data structures used by the multi-tenant software architecture systems that provide unified transaction services. FIG. 4 illustrates several hierarchical data structures 402, 403, and 404 (which collectively can be referred to as the hierarchical data structure 244), which are accessible via the MT-IDP 246. FIG. 4 illustrates the relationships between the entities of the hierarchical data structures 402-404. The organization and linking of the hierarchical data structures of FIG. 4 can be referred to as a dependency graph. It is noted that the organization and type of the hierarchical data structures 402-404 is shown for illustrative purposes only, and that one or more of 3P-IDP representations 406 and 411 can implement different data structures, as desired.

The first hierarchical data structure 402 illustrates service providers 409, 412(1), and 412(2) that are fully integrated, and thus offer core services to a merchant 418, consumer 416, lightweight merchant 420(1), as well as to entities of an on-boarded service provider that is shown by second hierarchical data structure 404. In FIG. 4, the entities 412(1), 412(2), 414(1). 414(2), 416, and 420(1) are fully integrated into the multi-tenant platform 102, and are managed by the MT-IDP 246.

The hierarchical data structure 404 can correspond to the on-boarded service provider 110 and is managed by the 3P-IDP representation 406. Thus, the 3P-IDP representation 406 can be a representation, in the hierarchical data structure 244, of the actual 3P-IDP 212 used by the service provider 110. The Identity-as-a-Service (IaaS) services can further map different schema used by the 3P-IDP 212 to the hierarchical data structure 404. During onboarding of the service provider 110, the multi-tenant platform 102 can generate representations 408(1) and 408(2) for the consumers 214(1) and 214(2) that are managed by that tenant's 3P-IDP 212. The consumers 408(1) and 408(2) are not fully integrated into the multi-tenant platform 102 (e.g., unlike consumer 416), and are instead on-boarded onto the multi-tenant platform 102. The multi-tenant platform 102 can further generate representations in the first hierarchical data structure 402 by generating linked consumers 414(1) and 414(2). A linked consumer is an entity that represents a corresponding entity in another hierarchical data structure, and that contains a limited amount of the data for that corresponding entity. The linked consumers 414(1) and 414(2) link to the consumers 408(1) and 408(2), respectively.

During the process of onboarding the service provider 108, the multi-tenant platform 102 can similarly generate the hierarchical data structure 403 that is managed by the 3P-IDP representation 411. As shown, the multi-tenant platform 102 can generate representations 432(1) and 432(2) of the merchants 206(1) and 206(2), respectively. The actual identities of the merchants 206(1) and 206(2) are managed by that tenant's 3P-IDP 204, and their representations 432(1) and 432(2) are managed by a 3P-IDP representation 411 of the tenant's 3P-IDP 204. The merchants 432(1) and 432(2) are not fully integrated into the multi-tenant platform 102 (unlike merchant 418), and are instead on-boarded onto the multi-tenant platform 102. During the on-boarding process, the multi-tenant platform 102 can also generate a lightweight merchant 420(1) that links to the merchants 432(1). A lightweight merchant is an entity that represents a corresponding entity in another hierarchical data structure, and that contains some of the data for that corresponding entity.

The hierarchical data structure 402 indicates that the linked consumers 414(1) and 414(2) are child nodes of the node of the service provider 412(1), and thus are acted upon by the service provider 412(1). However, the service provider 412(1) does not directly modify the linked to consumers 408(1) and 408(2). Similarly, the hierarchical data structure 402 indicates that the lightweight merchant 420(1) is a child node of the node of the service provider 412(2), and thus are acted upon by the service provider 412(2). However, the service provider 412(2) does not directly modify the linked to merchant 432(1). An example of this is where the merchant 432(1) is operating as merchant of a service provider indicated by the 3P-IDP representation 409, which can be a marketplace tenant. Although the lightweight merchants 420(1) can inherit any access permissions from the service provider 412(2), the 3P-IDP representation 411 provides the access to the merchant 206(1) that is represented by 432(1). In case of access permission conflict, access permissions indicated by merchants 206(1) prevails, followed by access permissions indicated by merchant 432(1), and lastly by the lightweight merchant 420(1). However, in some cases, the multi-tenant architecture 102 can be configured to change and/or propagate any access permissions of the merchant 432(1) and/or merchant 206(1) based on access permissions of the lightweight merchant 420(1).

Figure 5:
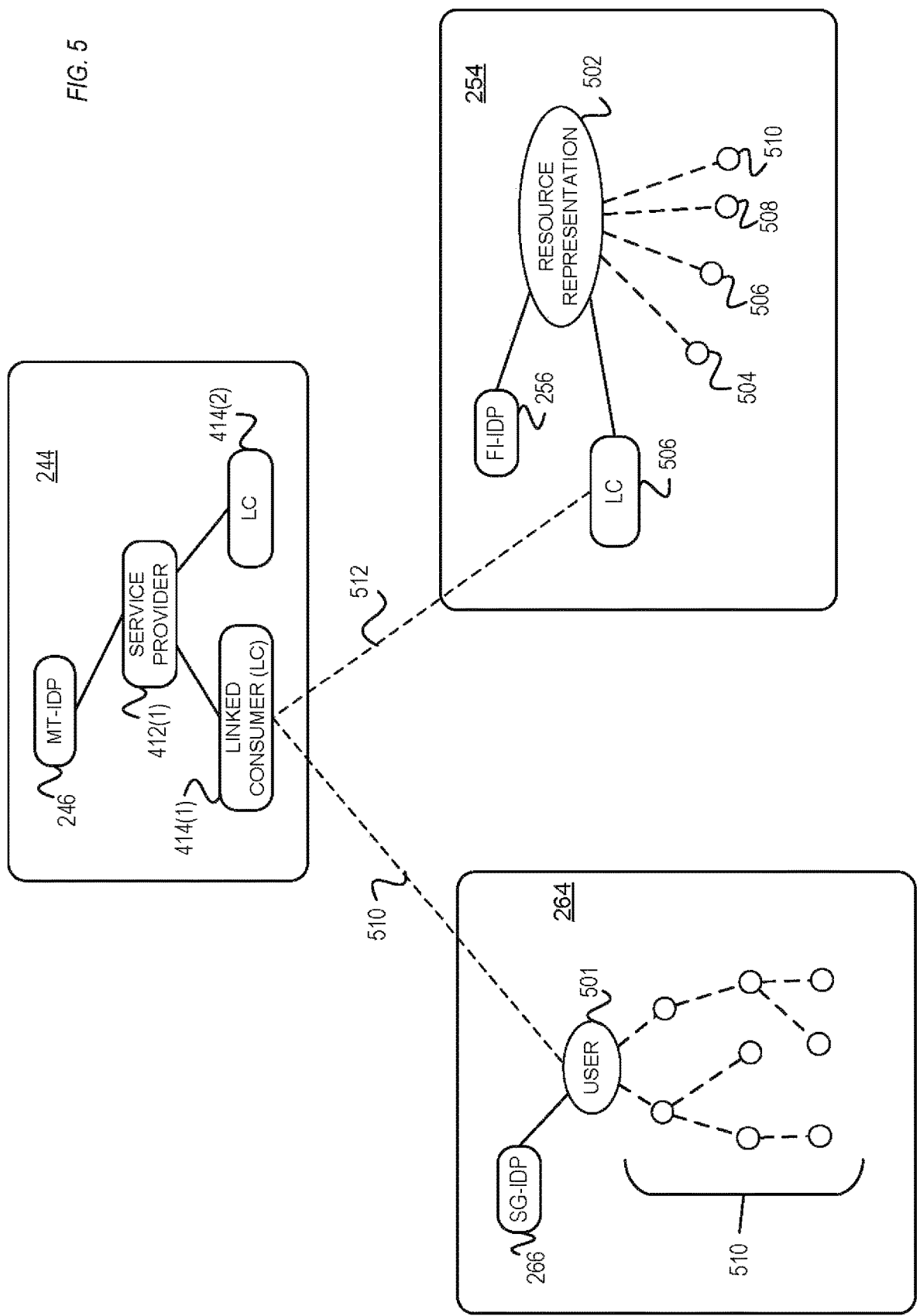
FIG. 5 is a diagram illustrating embodiments of relationships between a multi-tenant identity service, multi-tenant transaction resource service, and multi-tenant social graph service for unified transaction services.

FIG. 5 is a diagram illustrating embodiments of relationships between a multi-tenant identity service, multi-tenant transaction resource service, and multi-tenant social graph service for unified transaction services. FIG. 5 illustrates example relationships between various data structures and services used by the multi-tenant platform 102 for a particular user. FIG. 5 is described with reference to the examples shown in FIGS. 1-4 for ease of explanation.

The hierarchical data structure 244 manages the multi-tenant identity and includes the MT-IDP 246 that links to a service provider 412(1), which in turn is linked to two linked consumers 414(1) and 414(2). The hierarchical data structure 244 can include similar content to what is shown by FIG. 4, with simplifications for readability purposes. Various implementations of generating the hierarchical data structure 244 when onboarding tenants are discussed above with reference to FIGS. 1-4.

The hierarchical data structure 264 includes the SG-IDP 266 that manages the social graph connections for each user, includes the node for a user 501, as well as a connection graph 510 that indicates the social connections between other users and the user 501. The connection graph 510 shows links between various users and the order of their associations. The MT-SG domain supports a network model of users associated with tenants, where these users can be associated with MT-IDP linked consumers (i.e., that correspond to various users). Each of these users, including the user 501, can be associated with a unique resource representation (e.g., as discussed with reference to the transaction resource service). The LC 414(1) can include a user ID that corresponds to the user 501 element in the hierarchical data structure 264. The LC 414(1) can also include a resource representation that corresponds to the resource representation 502 in the hierarchical data structure 254.

The hierarchical data structure 254 includes the FI-IDP 256 that manages the resources 504-510, which can represent a portion of the resources 162 that are associated with the user. As noted above, this portion of the resources 162 can be mapped to the resources 164. This mapping can be noted by the resource representation 502. Thus, the MT-FI can model a tenant-based transaction resource manager that is associated with the consumer's representation and transaction resources. The transaction resource manager can include the associated transaction resources 504-510, which for implementation of financial instruments, can correspond to a bank, account balance, and/or types of cards (Credit, Debit, Pre-paid for the user). As shown in the diagram, the resource representation 502 can be associated with a particular tenant (i.e., the service provider 412(1) that is associated with various transaction resources including 504-510. In some implementations, the service provider 412(1) may support multiple resource representations.

The MT-SG 160 allows for managing social relationships between identities across different namespaces. As shown in FIG. 5, the user 501 can be linked, via the LC 414(1), from the hierarchical data structure 244 of the identity services 132. The hierarchical data structure 264 associated with the user 501 can indicate that the user 501 interacts with various users represented by nodes in the graph portion 510. These nodes, that can represent identities of other users in the namespace of the tenant associated with the service provider 412(1), can be derived from the MT-IDP 246. The links between the nodes of the graph portion 510 can represent various characteristics of interaction between the users. For transaction services, the interaction can be characterized with a transaction amount, a type of transaction resources used, an actual source of the transaction resource. Other such characteristics can indicate any messages exchanges, similar interests between the users, co-location, proximity, relationships (friend, spouse, family, etc.) and/or other attributes that qualify these links. Once the hierarchical data structure 244 is established, for any future interactions of the user 501, the hierarchical data structure of the MT-SG 160 can be used to build user experiences. For example, for sending actual transaction resources from the user's 501 account, the mt-transaction processor 101 can determine certain relevant receivers based on the MT-SG 160.

Figure 6:
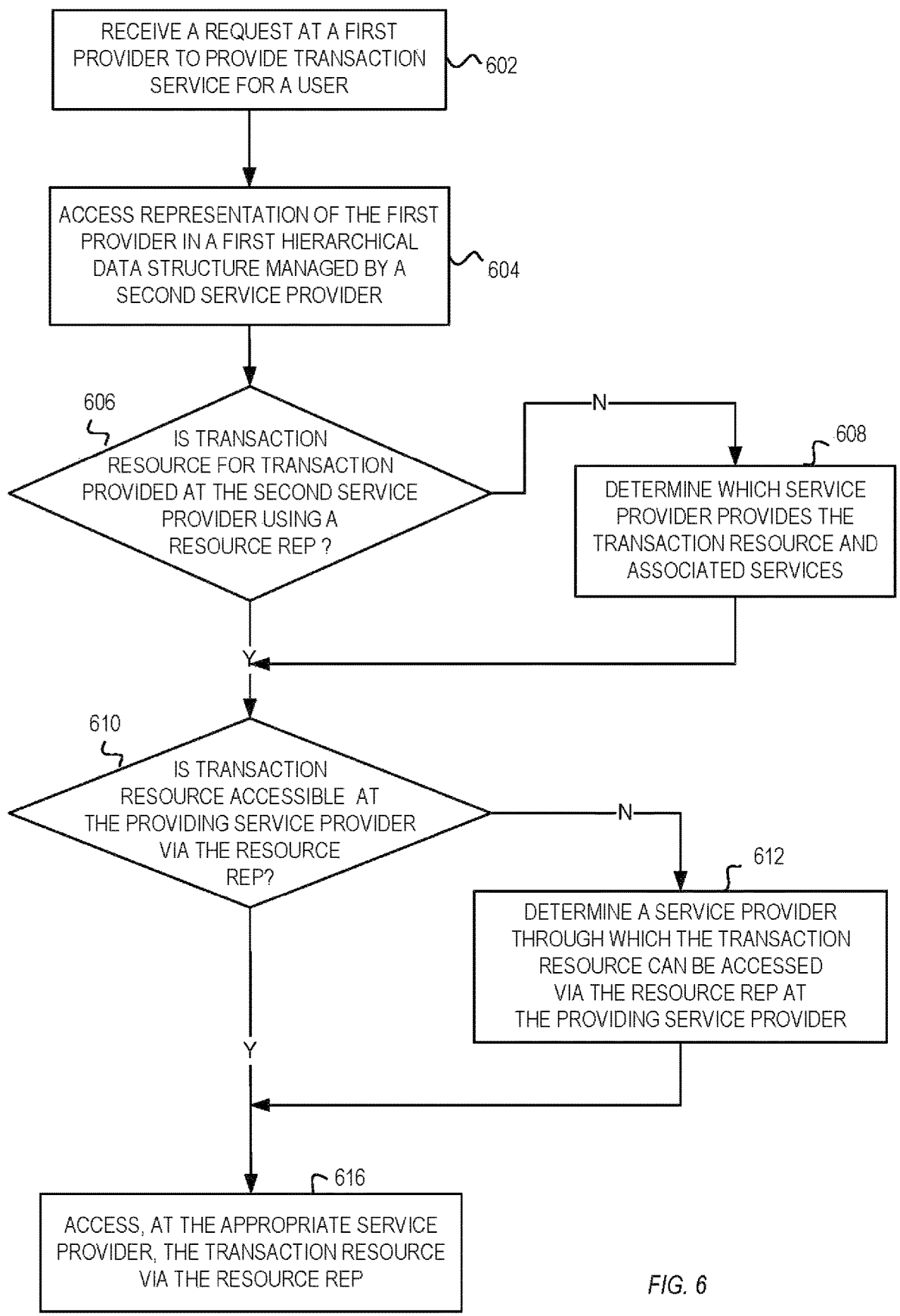
FIG. 6 is a flow diagram illustrating embodiments of operations for using multi-tenant software architecture systems that provide unified transaction services.

FIG. 6 is a flow diagram illustrating embodiments of operations for using multi-tenant software architecture systems that provide unified transaction services. The method of FIG. 6 is described with reference to the systems and components described in FIGS. 1-5 (for illustration purposes and not as a limitation). The example operations can be carried out by the transaction processor that uses the multi-tenant platform 102.

Beginning with 602, the processing system 100 receives a request at a first provider to provide a service to a user. The first provider can be a service provider 208 that is on-boarded by the multi-tenant platform 102, and thus can provide on-boarded services to the users via the multi-tenant platform 102. In some embodiments, the request can be received by the actual service provider, such as by the service provider 108 (as illustrated by FIG. 3). The request can be for a transaction service that is provided by the onboarded service provider. The transaction service can be for transaction resources that appear to be a part of the service provider 108, but are actually hosted by another service provider, such as by the service provider 164. In some embodiments, the multi-tenant platform 102 can receive the request from the user device 104 for a transaction that appears to be provided by the multi-tenant platform 102 and that uses resources that appear to be hosted by the multi-tenant platform 102. The actual service that provides the requested transaction can be performed by another certain service on the multi-tenant platform 102 for a fully on-boarded service provider, or can be performed by another service at another service provider that isn't fully onboarded.

At 604, the multi-tenant platform 102 accesses a representation of the first service provider in a first hierarchical data structure that is managed by the second service provider. With reference to FIG. 4, the multi-tenant platform 102 can access the hierarchical data structure 403 that represents the actual service provider 108, where the hierarchical data structure 403 is managed by the MT-IDP 246. With reference to FIG. 5, the multi-tenant platform 102 can access the LC 414(1) in the hierarchical data structure 244 that is managed via the MT-IDP 246. The multi-tenant platform 102 can also access the LC 506 in the hierarchical data structure 254 that is managed via the FI-IDP 256.

At 606, the multi-tenant platform 102 determines whether the transaction resource for the transaction is available at the second service provider using a resource representation. At 606, the multi-tenant platform 102 can first determine the transaction resource needed for the requested transaction. The multi-tenant platform 102 can determine whether the transaction resources corresponding to the resource representation are accessible via the first service provider or the second service provider. The multi-tenant platform 102 can determine that the transaction resources required for completion of the first transaction service are accessible at the second service provider based on the request which can indicate one or more of a type and a source of the transaction resources. The multi-tenant platform 102 can determine whether a second hierarchical data structure, that is managed by the first transaction service, includes one or more transaction resources that are linked with the first representation in the first hierarchical data structure. The multi-tenant platform 102 can, responsive to determining that the second hierarchical data structure does not include the one or more transaction resources that are linked with the first representation, generate the resource representation at the second resource provider without linking to the first resource provider. If the transaction resource is available at the second service provider, flow continues to 610. Otherwise, flow continues to 608.

At 608, the multi-tenant platform 102 determines which service provider provides the transaction resource. For example, the determination is for whether the transaction resource is one of the core services 130(1) available at the multi-tenant platform 102 (acting as the first service provider), or is a service that is provided by another service provider (also referred to as a "requested service provider").

At 610, the multi-tenant platform 102 determines whether the transaction resource is accessible at the provided service provider via the resource representation. The multi-tenant platform 102 can determine that the required transaction resources are accessible via the resource representation based on determining that a second hierarchical data structure, that is managed by the first transaction service, includes the one or more transaction resources that are linked with the first representation in the first hierarchical data structure. For example, the multi-tenant platform 102 can determine that additional user information (for the user and/or the second service provider) that is needed to access the service is not available at the first hierarchical data structure. For example, the multi-tenant platform 102 can determine certain user data from the representation in the first data structure, but also determine that additional user information is needed to perform the service. If the user data is available at another service provider, flow continues to 612. Otherwise, flow continues to 616.

At 612, the multi-tenant platform 102 determines a service provider through which the transaction resource can be accessed via the resource representation at the provided service provider. For example, with reference to FIG. 3, the mt-transaction processor 101 can determine that the resources 164 (at the service provider 110) can be accessed via the resources 162 (at the service provider 108). In some embodiments, the multi-tenant platform 102 can determine to use another transaction processor instead of the mt-transaction processor 101. For example, the multi-tenant platform 102 can determine to use another transaction processor of the service provider 110 for processing (including accessing of the resource representation discussed below). The other transaction processor can be modelled as a representation transaction processor by the multi-tenant platform to facilitate access of the actual transaction processor at the service provider 110.

At 616, the multi-tenant platform 102 accesses, at the appropriate service provider, the transaction resource using the resource representation. The multi-tenant platform 102 can use the mt-transaction processor 101 to access the transaction resources 164 at the first service provider 110 via the resource representation. The mt-transaction processor 101 can be configured to route the first transaction service with reference to the transaction resource 164 through additional services, such as services 138, 140, and/or 312. In some embodiments, as discussed above, the multi-tenant platform 102 can use, via the representation of the service provider, the actual transaction processor of the service provider 110 to access the transaction resources 164 at the first service provider 110 via the resource representation.

The multi-tenant platform 102 can determine a user representation of the user at third service provider, the third service provider modeling a social graph of connections between the user and a plurality of users. The multi-tenant platform 102 can process the first transaction service using the social graph. The third service provider can be accessible, at the first service provider, via the second service provider using the first representation. The multi-tenant platform 102 can generate a resource request for consuming a first amount of transaction resources, via the resource representation, for the first transaction service. With reference to FIG. 3, the transaction processor 101 can generate a resource request to access the transaction resource 164 at the service provider 110.

It should be understood that FIGS. 1-6 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIGS. 5 and 6 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 7:
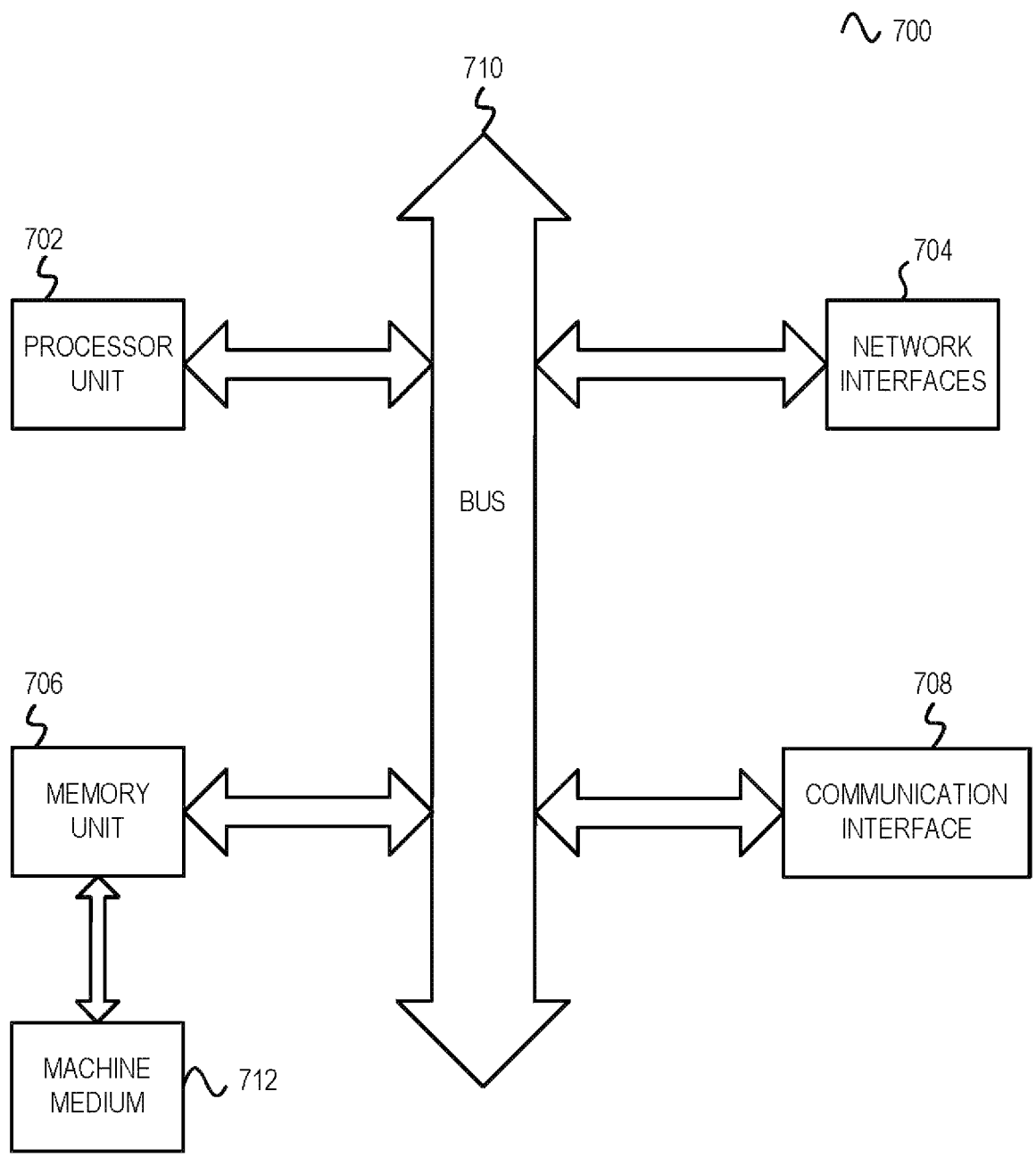
FIG. 7 is a block diagram illustrating embodiments of electronic devices used in the communication systems of FIGS. 1-6.

FIG. 7 is a block diagram of one embodiment of an electronic device 700 used in the communication systems of FIGS. 1-6. In some implementations, the electronic device 700 may be a laptop computer, a tablet computer, a mobile phone, a kiosk, a powerline communication device, a smart appliance (PDA), a server, and/or one or more other electronic systems. For example, a user device may be implemented using a mobile device, such as a mobile phone or a tablet computer. For example, a payment system may be implemented using one or more servers. The electronic device 700 can include a processor unit 702 (possibly including multiple processors, multiple cores, multiple nodes, and/or implementing multi-threading, etc.). The electronic device 700 can also include memory unit 706 and may access machine medium 712. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media (such as shown by machine medium 712). The electronic device 700 can also include a bus 710 (e.g., PCI, ISA, PCI-Express, HyperTransport®, InfiniBand®, NuBus, AHB, AXI, etc.), and network interfaces 704 can include wire-based interfaces (e.g., an Ethernet interface, a power-line communication interface, etc.). The electronic device 700 includes a communication interface 708 for network communications. The communication interface 708 can include at least one of a wireless network interface (e.g., a WLAN interface, a Bluetooth interface, a WiMAX interface, a ZigBee interface, a Wireless USB interface, etc.), In some implementations, the electronic device 700 may support multiple network interfaces—each of which is configured to couple the electronic device 700 to a different communication network.

The memory unit 706 can embody functionality to implement embodiments described in FIGS. 1-6 above. In one embodiment, the memory unit 706 can include one or more of functionalities for using unified transaction services in a multi-tenant architecture system. Any one of these functionalities may be partially (or entirely) implemented in hardware and/or on the processor unit 702. For example, some functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, memory unit 706, the network interfaces 704, and the communication interface 708 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the present disclosure is not limited to them. In general, techniques for using unified transaction services in a multi-tenant architecture system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for using unified identity services in a multi-tenant architecture system, the method comprising:
   accessing a request, associated with a first service provider, to provide a first transaction service for an entity registered with the first service provider, the first service provider configured to provide a first set of services for the entity;
   accessing a first representation of the first service provider in a first hierarchical data structure, the first hierarchical data structure being managed by a second service provider, the second service provider managing a plurality of user identities of a plurality of users;
   determining, based on the first representation, that a first transaction resource required for processing of the first transaction service is provided at a third service provider and accessible via a resource representation, wherein the resource representation is implemented as part of a second hierarchical data structure and provides access to a plurality of transaction resources including the first transaction resource, and wherein at least one of the first hierarchical data structure or the second hierarchical data structure contains a plurality of nodes that each represent a different user account of a different user of the plurality of users;
   responsive to determining that the first transaction resource is provided at the third service provider, accessing, at the second service provider, the first transaction resource via the resource representation;
   determining a user representation of a user of the plurality of users at the third service provider based at least in part on a social graph comprising connections between a node of the plurality of the nodes that represent the user and a subset of the plurality of nodes that represent other users of the plurality of users, wherein the connections of the social graph represent characteristics of interactions between the user and the other users, and wherein the characteristics comprise one or more of: a transaction amount, a type of transaction resource used, an actual source of the transaction resource, a message exchange between two or more of the plurality of users, a common interest between two or more of the plurality of users, a common location between two or more of the plurality of users, or a proximity between two or more of the plurality of users; and
   processing the first transaction service using the social graph.

2. The method of claim 1, wherein the first service provider is configured to provide, via a network, a first set of services to one or more devices associated with the entity, wherein the first set of services does not include functionality of the first transaction service.

3. The method of claim 1, further comprising accessing a transaction processor using the first transaction resource at the second service provider via the resource representation, wherein the transaction processor is configured to route the first transaction service with reference to the first transaction resource through additional services.

4. The method of claim 1, further comprising generating a resource request for consuming a first amount of the first transaction resource, via the resource representation, for the first transaction service.

5. The method of claim 1, further comprising onboarding the third service provider onto the first hierarchical data structure of the second service provider to expose services provided by the third service provider to a linked identity reference from the second service provider.

6. The method of claim 1, wherein the second hierarchical data structure is linked with the first hierarchical data structure.

7. The method of claim 1, wherein the second hierarchical data structure provides access to the plurality of transaction resources to a plurality of entities represented by the first hierarchical data structure.

8. A system comprising:
a non-transitory memory storing instructions; and
a processor configured to execute the instructions to cause the system to:
receive a request, from a first service provider, to provide a first transaction service for a user registered with the first service provider;
access a first representation of the first service provider in a first hierarchical data structure, the first hierarchical data structure being managed by a second service provider, the second service provider managing a plurality of user identities of a plurality of users that include the user;
determine, based on the first representation, that a first transaction resource required for processing of the first transaction service is provided at a third service provider and accessible via a resource representation associated with a second hierarchical data structure, wherein the second hierarchical data structure provides access to a plurality of transaction resources including the first transaction resource, and wherein the first hierarchical data structure and the second hierarchical data structure each contains a plurality of nodes that represent a plurality of different user accounts, respectively;
responsive to determining that the first transaction resource is provided at the third service provider, access, at the second service provider, the first transaction resource via the resource representation;
determine, at least in part via a social graph, a user representation of a user of the plurality of users at the third service provider, wherein the social graph is modeled by the third service provider and comprises a plurality of connections interconnecting a plurality of nodes, wherein each node of the plurality of nodes represents a respective user of the plurality of users, and wherein each connection of the plurality of connections corresponds to a characteristic of an interaction between the nodes interconnected by the connection; and
processing the first transaction service using the social graph.

9. The system of claim 8, wherein executing the instructions further cause the system to,
access a transaction processor using the first transaction resource at the second service provider via the resource representation, wherein the transaction processor is configured to route the first transaction service with reference to the first transaction resource through additional services.

10. The system of claim 8, wherein executing the instructions further cause the system to,
generate a resource request for consuming a first amount of the first transaction resource, via the resource representation, for the first transaction service.

11. The system of claim 8, wherein executing the instructions further cause the system to,
onboard the third service provider onto the first hierarchical data structure of the second service provider to expose services provided by the third service provider to a linked identity reference from the second service provider.

12. The system of claim 8, wherein the second hierarchical data structure provides access to the plurality of transaction resources to a plurality of entities represented by the first hierarchical data structure.

13. A non-transitory machine-readable medium having instructions stored thereon, the instructions executable to cause performance of operations comprising:
receiving a request, from a first service provider, to provide a first transaction service for a user of a plurality of users registered with the first service provider;
accessing a first representation of the first service provider in a first hierarchical data structure, the first hierarchical data structure being managed by a second service provider, the second service provider managing a user identity of the user;
determining, based on the first representation, that a first transaction resource required for processing of the first transaction service is provided at a third service provider and accessible via a resource representation that is implementable as a part of a second hierarchical data structure, wherein the second hierarchical data structure comprises a different set of nodes than the first hierarchical data structure, the nodes representing different user accounts, wherein the second hierarchical data structure enables an access to at least the first transaction resource;
responsive to determining that the first transaction resource is provided at the third service provider, accessing, at the second service provider, the first transaction resource via the resource representation;
accessing a user representation of the user at the third service provider, wherein the user representation is associated with a social graph comprising connections between a node of the plurality of the nodes that represent the user and a subset of the plurality of nodes that represent other users of the plurality of users, wherein the connections of the social graph represent characteristics of interactions between the user and the other users, and wherein the characteristics comprise one or more of: a transaction amount, a type of transaction resource used, an actual source of the transaction resource, a message exchange between two or more of the plurality of users, a common interest between two or more of the plurality of users, a common location between two or more of the plurality of users, or a proximity between two or more of the plurality of users; and
processing the first transaction service using the social graph.

14. The non-transitory machine-readable medium of claim 13, wherein the operations further comprise:
accessing a transaction processor using the first transaction resource at the second service provider via the resource representation, wherein the transaction processor is configured to route the first transaction service with reference to the first transaction resource through additional services.

15. The non-transitory machine-readable medium of claim 13, wherein the operations further comprise:
generating a resource request for consuming a first amount of the first transaction resource, via the resource representation, for the first transaction service.

16. The non-transitory machine-readable medium of claim 13, wherein the operations further comprise:
onboarding the third service provider onto the first hierarchical data structure of the second service provider to expose services provided by the third service provider to a linked identity reference from the second service provider.

17. The non-transitory machine-readable medium of claim 13, wherein the second hierarchical data structure provides access to a plurality of transaction resources, including the transaction resource, to a plurality of entities represented by the first hierarchical data structure.

18. The method of claim 1, wherein the social graph is provided by a multi-tenant graph service that includes service endpoints that access a plurality of social media applications.

19. The system of claim 8, wherein the characteristic comprises: a transaction amount, a type of transaction resource used, an actual source of the transaction resource, a message exchange between two or more of the plurality of users, a common interest between two or more of the plurality of users, a common location between two or more of the plurality of users, or a physical proximity between two or more of the plurality of users, and wherein the social graph is provided by a multi-tenant graph service that includes service endpoints that enable accessing a plurality of social media applications.

20. The non-transitory machine-readable medium of claim 13, wherein the social graph is provided by a multi-tenant graph service that includes service endpoints that enable accessing a plurality of social media applications.

* * * * *